US009290056B2

(12) United States Patent
Ishizaka et al.

(10) Patent No.: US 9,290,056 B2
(45) Date of Patent: Mar. 22, 2016

(54) PNEUMATIC TIRE

(75) Inventors: Takahide Ishizaka, Hiratsuka (JP);
Kouichi Kawabata, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/342,331

(22) PCT Filed: Sep. 2, 2011

(86) PCT No.: PCT/JP2011/070058
§ 371 (c)(1),
(2), (4) Date: Jun. 3, 2014

(87) PCT Pub. No.: WO2013/031021
PCT Pub. Date: Mar. 7, 2013

(65) Prior Publication Data
US 2014/0373992 A1    Dec. 25, 2014

(51) Int. Cl.
*B60C 9/18* (2006.01)
*B60C 9/22* (2006.01)
*B60C 9/28* (2006.01)
*B60C 9/20* (2006.01)

(52) U.S. Cl.
CPC ............. *B60C 9/20* (2013.01); *B60C 9/2006* (2013.04); *B60C 2009/1871* (2013.04); *B60C 2009/208* (2013.04); *B60C 2009/2012* (2013.04); *B60C 2009/2067* (2013.04); *B60C 2009/2077* (2013.04); *B60C 2009/2083* (2013.04); *B60C 2009/2093* (2013.04); *B60C 2200/06* (2013.04)

(58) Field of Classification Search
CPC ...... B60C 9/18; B60C 9/1807; B60C 9/1835; B60C 9/185; B60C 9/20; B60C 9/22; B60C 9/2204; B60C 9/28
See application file for complete search history.

(56) References Cited

U.S. PATENT DOCUMENTS

| | | | |
|---|---|---|---|
| 5,383,507 A * | 1/1995 | Sato et al. | 152/527 |
| 7,251,922 B2 * | 8/2007 | Morioka et al. | 57/236 |
| 2010/0170610 A1 * | 7/2010 | Domingo et al. | 152/548 |
| 2010/0212802 A1 * | 8/2010 | Yano | 152/527 |

FOREIGN PATENT DOCUMENTS

| | | |
|---|---|---|
| DE | 10 2010 000 181 | 7/2011 |
| JP | 2003-211911 | 7/2003 |
| JP | 2004-352040 | * 12/2004 |
| JP | 2006-151212 | 6/2006 |
| JP | 2007-161054 | 6/2007 |
| JP | 2009-101909 | 5/2009 |
| JP | 2011-105100 | 6/2011 |
| JP | 2011-162069 | 8/2011 |

OTHER PUBLICATIONS

International Search Report dated Nov. 1, 2011, 2 pages, Japan.

* cited by examiner

*Primary Examiner* — Justin Fischer
(74) *Attorney, Agent, or Firm* — Thorpe North & Western

(57) ABSTRACT

The pneumatic tire 1 includes a belt layer 14 that is formed by laminating a plurality of belt plies 141 to 145 including the circumferential reinforcing layer 145. Also, the belt layer 14 includes at least two belt plies on the outer side in the tire radial direction of the circumferential reinforcing layer 145. Also, the intercord distances T1 to Tk have a relationship such that $T1 \leq T2 \leq \ldots \leq Tk$ and $T1 < Tk$.

16 Claims, 13 Drawing Sheets

| | Conventional Example | Working Example 1 | Working Example 2 | Working Example 3 | Working Example 4 | Working Example 5 |
|---|---|---|---|---|---|---|
| Belt layer structure | FIG. 4 | FIG. 4 | FIG. 4 | FIG. 4 | FIG. 4 | FIG. 4 |
| Intercord distance | T1=T2 | T1<T2 | T1<T2 | T1<T2 | T1<T2 | T1<T2 |
| T1 [mm] | 0.3 | 0.3 | 0.2 | 0.3 | 0.3 | 0.5 |
| T2 [mm] | 0.3 | 0.9 | 0.5 | 0.8 | 1.1 | 0.9 |
| T2/T1 | 1.0 | 3.0 | 2.5 | 2.5 | 3.7 | 1.8 |
| Number of ends | E1>E0>E2 | E0>E1>E2 | E0>E1>E2 | E0>E1>E2 | E0>E1>E2 | E0>E1>E2 |
| E0 [ends/50 mm] | 22 | 22 | 17 | 20 | 20 | 16 |
| E1 [ends/50 mm] | 24 | 20 | 16 | 18 | 18 | 14 |
| E2 [ends/50 mm] | 20 | 18 | 14 | 16 | 16 | 12 |
| E0/E2 | 1.1 | 1.2 | 1.2 | 1.3 | 1.3 | 1.3 |
| Modulus | M1=M2 | M1>M2 | M1>M2 | M1>M2 | M1>M2 | M1>M2 |
| M1 [N/cm$^2$] | 60 | 100 | 110 | 100 | 100 | 89 |
| M2 [N/cm$^2$] | 60 | 56 | 50 | 56 | 56 | 19 |
| M2/M1 | 1.00 | 0.56 | 0.45 | 0.56 | 0.56 | 0.21 |
| Belt angle of belt cover deg | 17 | 22 | 17 | 22 | 22 | 22 |
| Degree of elongation when subjected to a tension load of 150 N to 200 N [%] | 2.5 | 3.3 | 3.3 | 3.3 | 3.3 | 3.0 |
| Heel and toe wear resistance performance | 100 | 130 | 125 | 125 | 130 | 110 |
| Block tear resistance performance | 100 | 130 | 125 | 125 | 130 | 110 |
| Durability | 100 | 115 | 110 | 115 | 110 | 103 |

FIG. 10a

|  | Working Example 6 | Working Example 7 | Working Example 8 | Working Example 9 | Working Example 10 |
|---|---|---|---|---|---|
| Belt layer structure | FIG. 4 | FIG. 4 | FIG. 4 | FIG. 4 | FIG. 4 |
| Intercord distance | T1<T2 | T1<T2 | T1<T2 | T1<T2 | T1<T2 |
| T1 [mm] | 0.3 | 0.3 | 0.1 | 0.3 | 0.6 |
| T2 [mm] | 0.6 | 1.2 | 0.3 | 1.5 | 0.9 |
| T2/T1 | 2.0 | 4.0 | 3.0 | 5.0 | 1.5 |
| Number of ends | E0>E1>E2 | E0>E1>E2 | E0>E1>E2 | E0>E1>E2 | E0>E1>E2 |
| E0 [ends/50 mm] | 22 | 28 | 28 | 30 | 31 |
| E1 [ends/50 mm] | 20 | 22 | 22 | 26 | 29 |
| E2 [ends/50 mm] | 18 | 15 | 16 | 24 | 27 |
| E0/E2 | 1.2 | 1.9 | 1.8 | 1.3 | 1.1 |
| Modulus | M1>M2 | M1>M2 | M1>M2 | M1>M2 | M1>M2 |
| M1 [N/cm$^2$] | 100 | 100 | 80 | 90 | 120 |
| M2 [N/cm$^2$] | 56 | 56 | 72 | 70 | 80 |
| M2/M1 | 0.56 | 0.56 | 0.90 | 0.78 | 0.67 |
| Belt angle of belt cover deg | 17 | 17 | 10 | 45 | 22 |
| Degree of elongation when subjected to a tension load of 150 N to 200 N [%] | 3.3 | 3.3 | 3.3 | 5.0 | 2.0 |
| Heel and toe wear resistance performance | 125 | 130 | 110 | 115 | 115 |
| Block tear resistance performance | 125 | 130 | 110 | 115 | 115 |
| Durability | 115 | 110 | 110 | 110 | 105 |

FIG. 10b

|  | Working Example 11 | Working Example 12 | Working Example 13 | Working Example 14 | Working Example 15 | Working Example 16 | Working Example 17 |
| --- | --- | --- | --- | --- | --- | --- | --- |
| Belt layer structure | FIG. 8 | FIG. 8 | FIG. 8 | FIG. 8 | FIG. 8 | FIG. 8 | FIG. 9 |
| Intercord distance | T1<T2 | T1<T2 | T1<T2 | T1<T2 | T1<T2 | T1<T2 | T1=T2 |
| T1 [mm] | 0.3 | 0.3 | 0.2 | 0.2 | 0.3 | 0.5 | 0.3 |
| T2 [mm] | 1.1 | 0.6 | 0.7 | 0.3 | 1.2 | 1.5 | 0.3 |
| T2/T1 | 3.7 | 2.0 | 3.5 | 1.5 | 4.0 | 3.0 | 1.0 |
| Number of ends | E0=E1=E2 | E0=E1=E2 | E0=E1=E2 | E0=E1=E2 | E0=E1=E2 | E0=E1=E2 | E0>E1>E2 |
| E0 [ends/50 mm] | 22 | 22 | 22 | 22 | 22 | 22 | 17 |
| E1 [ends/50 mm] | 22 | 22 | 22 | 22 | 22 | 22 | 16 |
| E2 [ends/50 mm] | 22 | 22 | 22 | 22 | 22 | 22 | 15 |
| E0/E2 | 1.0 | 1.0 | 1.0 | 1.0 | 1.0 | 1.0 | 1.1 |
| Modulus | M1=M2 | M1=M2 | M1=M2 | M1=M2 | M1=M2 | M1=M2 | M1=M2 |
| M1 [N/cm$^2$] | 60 | 60 | 60 | 60 | 60 | 60 | 60 |
| M2 [N/cm$^2$] | 60 | 60 | 60 | 60 | 60 | 60 | 60 |
| M2/M1 | 1.00 | 1.00 | 1.00 | 1.00 | 1.00 | 1.00 | 1.00 |
| Belt angle of belt cover deg | 17 | 17 | 17 | 17 | 17 | 17 | 17 |
| Degree of elongation when subjected to a tension load of 150 N to 200 N [%] | 3.3 | 3.3 | 3.3 | 3.3 | 3.3 | 3.3 | 3.3 |
| Heel and toe wear resistance performance | 115 | 110 | 115 | 105 | 120 | 120 | 105 |
| Block tear resistance performance | 115 | 110 | 115 | 105 | 120 | 120 | 105 |
| Durability | 110 | 105 | 110 | 105 | 110 | 105 | 105 |

FIG. 11a

| | Working Example 18 | Working Example 19 | Working Example 20 | Working Example 21 | Working Example 22 | Working Example 23 | Working Example 24 |
|---|---|---|---|---|---|---|---|
| Belt layer structure | FIG. 9 | FIG. 9 | FIG. 9 | - | - | - | - |
| Intercord distance | T1=T2 | T1=T2 | T1=T2 | T1=T2 | T1=T2 | T1=T2 | T1=T2 |
| T1 [mm] | 0.3 | 0.3 | 0.3 | 0.3 | 0.3 | 0.3 | 0.3 |
| T2 [mm] | 0.3 | 0.3 | 0.3 | 0.3 | 0.3 | 0.3 | 0.3 |
| T2/T1 | 1.0 | 1.0 | 1.0 | 1.0 | 1.0 | 1.0 | 1.0 |
| Number of ends | E0>E1>E2 | E0>E1>E2 | E0>E1>E2 | E0=E1=E2 | E0=E1=E2 | E0=E1=E2 | E0=E1=E2 |
| E0 [ends/50 mm] | 22 | 30 | 32 | 22 | 22 | 22 | 22 |
| E1 [ends/50 mm] | 20 | 25 | 18 | 22 | 22 | 22 | 22 |
| E2 [ends/50 mm] | 18 | 20 | 16 | 22 | 22 | 22 | 22 |
| E0/E2 | 1.2 | 1.5 | 2.0 | 1.0 | 1.0 | 1.0 | 1.0 |
| Modulus | M1=M2 | M1=M2 | M1=M2 | M1>M2 | M1>M2 | M1>M2 | M1>M2 |
| M1 [N/cm$^2$] | 60 | 60 | 60 | 110 | 60 | 100 | 90 |
| M2 [N/cm$^2$] | 60 | 60 | 60 | 50 | 40 | 56 | 70 |
| M2/M1 | 1.00 | 1.00 | 1.00 | 0.45 | 0.67 | 0.56 | 0.78 |
| Belt angle of belt cover deg | 17 | 17 | 17 | 17 | 17 | 17 | 17 |
| Degree of elongation when subjected to a tension load of 150 N to 200 N [%] | 3.3 | 3.3 | 3.3 | 3.3 | 3.3 | 3.3 | 3.3 |
| Heel and toe wear resistance performance | 105 | 105 | 102 | 105 | 103 | 105 | 105 |
| Block tear resistance performance | 105 | 105 | 102 | 105 | 103 | 105 | 105 |
| Durability | 105 | 105 | 100 | 105 | 103 | 105 | 105 |

FIG. 11b

PNEUMATIC TIRE

TECHNICAL FIELD

The present invention relates to a pneumatic tire, and more particularly relates to a pneumatic tire that can improve the uneven wear resistance.

BACKGROUND OF THE INVENTION

Conventional pneumatic tires have a circumferential reinforcing layer in a belt layer in order to suppress the radial growth of tires. The technology disclosed in Japanese Unexamined Patent Application Publication No. 2007-161054A, Japanese Unexamined Patent Application Publication No. 2006-151212A or Japanese Unexamined Patent Application Publication No. 2011-105100A is known as conventional pneumatic tires that are configured in this manner.

However, in configurations in which a belt layer has a circumferential reinforcing layer, the stiffness in a tire circumferential direction is high, so the load on a tread portion is large when suddenly braking or suddenly accelerating. Therefore, there is the problem that uneven wear (in particular, heel and toe wear) can easily occur, compared with a configuration without a circumferential reinforcing layer in the belt layer.

SUMMARY

The present technology provides a pneumatic tire whereby uneven wear resistance can be improved. A pneumatic tire according to the present invention includes a belt layer formed by laminating a plurality of belt plies including a circumferential reinforcing layer. In such a pneumatic tire, the belt layer includes at least two of the belt plies outward in a tire radial direction of the circumferential reinforcing layer. Furthermore, when intercord distance is a distance in the tire radial direction between belt cords of adjacent belt plies, and a plurality of the intercord distances located in a region outward in the tire radial direction of the circumferential reinforcing layer are taken to be $T1, T2 \ldots Tk$ in order from the intercord distance inward in the tire radial direction (where k is a number of the belt plies located outward in the tire radial direction of the circumferential reinforcing layer), the intercord distances $T1$ to $Tk$ of adjacent belt plies have a relationship such that $T1 \leq T2 \leq \ldots \leq Tk$ and $T1 < Tk$.

Additionally, with the pneumatic tire according to the present invention, the intercord distance $T1$ and the intercord distance $Tk$ preferably have a relationship such that $2.0 \leq Tk/T1 \leq 4.0$.

Additionally, with the pneumatic tire according to the present invention, when numbers of ends of belt cords of a plurality of the belt plies located in a region outward in the tire radial direction of the circumferential reinforcing layer are taken to be $E0, E1 \ldots Ek$ in order from the number of ends of the belt cords of the circumferential reinforcing layer (where k is the number of the belt plies located outward in the tire radial direction of the circumferential reinforcing layer), the numbers of ends $E0$ to $Ek$ preferably have a relationship such that $E0 \geq E1 \geq \ldots \geq Ek$ and $E0 > Ek$.

Additionally, with the pneumatic tire according to the present invention, the number of ends $E0$ and the number of ends $Ek$ preferably have a relationship such that $1.0 < E0/Ek < 2.0$.

Additionally, with the pneumatic tire according to the present invention, when an intercord region is a region between the belt cords of adjacent belt plies, and a modulus at 100% elongation of a rubber material of a plurality of the intercord regions located in a region outward in the tire radial direction of the circumferential reinforcing layer are taken to be $M1, M2 \ldots Mk$ in order from the modulus of the intercord region inward in the tire radial direction (where k is the number of the belt plies located outward in the tire radial direction of the circumferential reinforcing layer), the moduli $M1$ to $Mk$ preferably have a relationship such that $M1 \geq M2 \geq \ldots \geq Mk$ and $M1 > Mk$.

Additionally, with the pneumatic tire according to the present invention, the modulus $M1$ and the modulus $Mk$ preferably have a relationship such that $0.2 \leq Mk/M1 < 1.0$.

Additionally, with the pneumatic tire according to the present invention, the plurality of belt plies preferably includes: a large angle belt; a pair of cross belts disposed outward in the tire radial direction of the large angle belt; a belt cover disposed outward in the tire radial direction of the pair of cross belts; and the circumferential reinforcing layer disposed between the pair of cross belts, inward in the tire radial direction of the pair of cross belts, or inward in the tire radial direction of the large angle belt.

Additionally, with the pneumatic tire according to the present invention, a belt angle, as an absolute value, of the belt cover is preferably not less than 10 deg and not greater than 45 deg.

Additionally, with the pneumatic tire according to the present invention, a degree of elongation of the belt cords of the belt cover when subjected to a tension load of 150 N to 200 N is preferably not less than 3.0% and not greater than 5.0%.

Additionally, with the pneumatic tire according to the present invention, the degree of elongation of the belt cords of the circumferential reinforcing layer when subjected to a tension load of 150 N to 200 N is not less than 2.0% and not greater than 5.0%.

Additionally, with the pneumatic tire according to the present invention, the belt layer includes a belt cover as an outermost layer, and a degree of elongation $\lambda 1$ of the belt cords of the circumferential reinforcing layer when subjected to a tension load of 150 N to 200 N and a degree of elongation $\lambda 2$ of the belt cords of the belt cover when subjected to a tension load of 150 N to 200 N have a relationship such that $\lambda 1 \leq \lambda 2$.

Additionally, with the pneumatic tire according to the present invention, the circumferential reinforcing layer is preferably disposed inward in the tire width direction of left and right edges of a narrower cross belt of the pair of cross belts, and a width W of the narrower cross belt and a distance S from an edge of the circumferential reinforcing layer to an edge of the narrower cross belt are preferably within the ranges such that $0.03 \leq S/W$.

In the pneumatic tire according to the present invention, in the region outward in the tire radial direction from the circumferential reinforcing layer, the intercord distances $T1$ to $Tk$ are set to have a relationship such that $T1 \leq T2 \leq \ldots \leq Tk$, and $T1 < Tk$, so variation in the stiffness of the tread portion is alleviated in the direction toward outward in the radial direction from the circumferential reinforcing layer. This has the advantage that the load acting on the tread portion is relieved, and the uneven wear resistance of the tire is increased.

BRIEF DESCRIPTION OF THE DRAWINGS

FIGS. 10a-10b include a table showing the results of performance testing of pneumatic tires according to the embodiments of the present invention.

FIGS. 11a-11b include a table showing the results of performance testing of pneumatic tires according to the embodiments of the present invention.

DETAILED DESCRIPTION

The present invention is described below in detail with reference to the accompanying drawing. However, the present invention is not limited to these embodiments. Moreover, constituents of the embodiment which can possibly or obviously be substituted while maintaining consistency with the present invention are included. Furthermore, a plurality of modified examples that are described in the embodiment can be freely combined within a scope of obviousness for a person skilled in the art.

Pneumatic Tire

Figure 1:
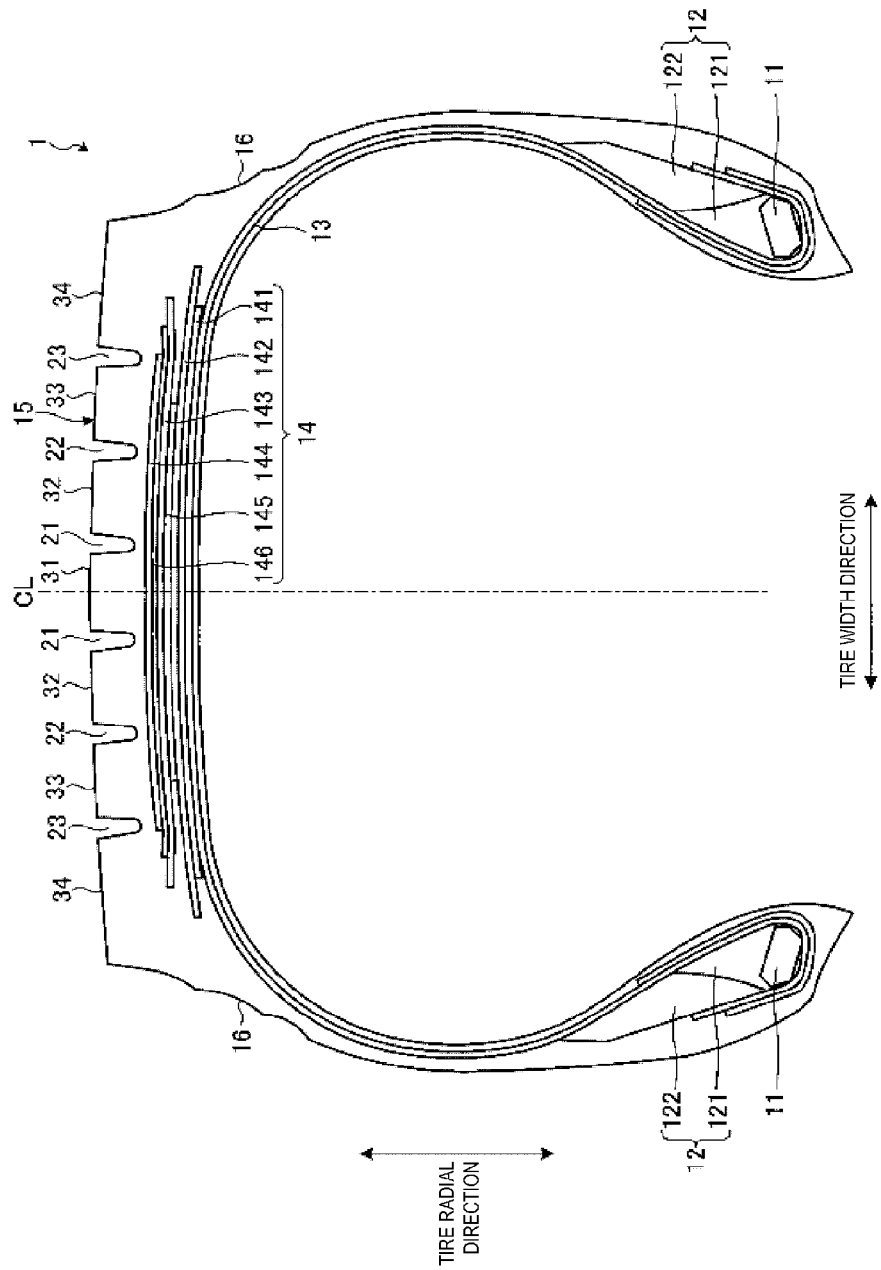
FIG. 1 is a cross-sectional view in a tire meridian direction illustrating a pneumatic tire according to an embodiment of the present invention.

FIG. 1 is a cross-sectional view in a tire meridian direction illustrating a pneumatic tire 1 according to an embodiment of the present invention. In this drawing, a radial tire for heavy loads that is mounted on trucks, buses, and the like for long-distance transport is illustrated as an example of pneumatic tire 1.

A pneumatic tire 1 includes a pair of bead cores 11,11, a pair of bead fillers 12,12, a carcass layer 13, a belt layer 14, tread rubber 15, and a pair of side wall rubbers 16,16 (see FIG. 1). The pair of bead cores 11,11 have annular structures and constitute cores of left and right bead portions. The pair of bead fillers 12,12 are formed from a lower filler 121 and an upper filler 122, and are disposed on a periphery of each of the pair of bead cores 11,11 in the tire radial direction so as to reinforce the bead portions. The carcass layer 13 has a single-layer structure, and stretches between the left and right bead cores 11 and 11 in toroidal form, forming a framework for the tire. Additionally, both ends of the carcass layer 13 are folded toward an outer side in the tire width direction so as to envelop the bead cores 11 and the bead fillers 12, and fixed. The belt layer 14 is formed from a plurality of belt plies 141 to 145 that are laminated, and is disposed on the periphery of the carcass layer 13 in the tire radial direction. The tread rubber 15 is disposed on the periphery of the carcass layer 13 and the belt layer 14 in the tire radial direction, and forms a tire tread. The pair of side wall rubbers 16,16 is disposed on each outer side of the carcass layer 13 in the tire width direction, so as to form left and right side wall portions of the tire.

Additionally, the pneumatic tire 1 has a plurality of circumferential main grooves 21 to 23 extending in the tire circumferential direction, a plurality of lug grooves (not illustrated on the drawings) extending in the tire width direction, and a plurality of land portions 31 to 34 partitioned by the circumferential main grooves 21 to 23 and the lug grooves in the tread portion. Thereby, a block-based tread pattern is formed (not illustrated on the drawings). However, the pneumatic tire 1 of the present invention is not limited thereto, and the pneumatic tire 1 may have a rib pattern (not illustrated). Also, the circumferential main grooves 21 to 23 may be straight grooves, or they may be zigzag grooves.

In this embodiment, the pneumatic tire 1 has a left-right symmetric construction centered on a tire equatorial plane CL.

Figure 2:
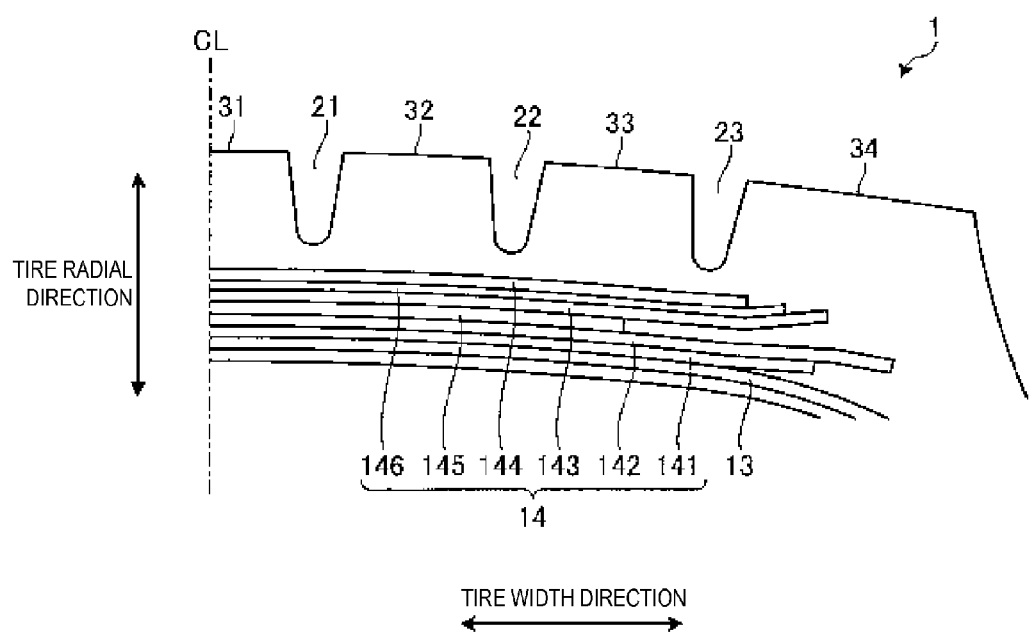
FIG. 2 is an explanatory view illustrating a belt layer of the pneumatic tire depicted in FIG. 1.
Figure 3:
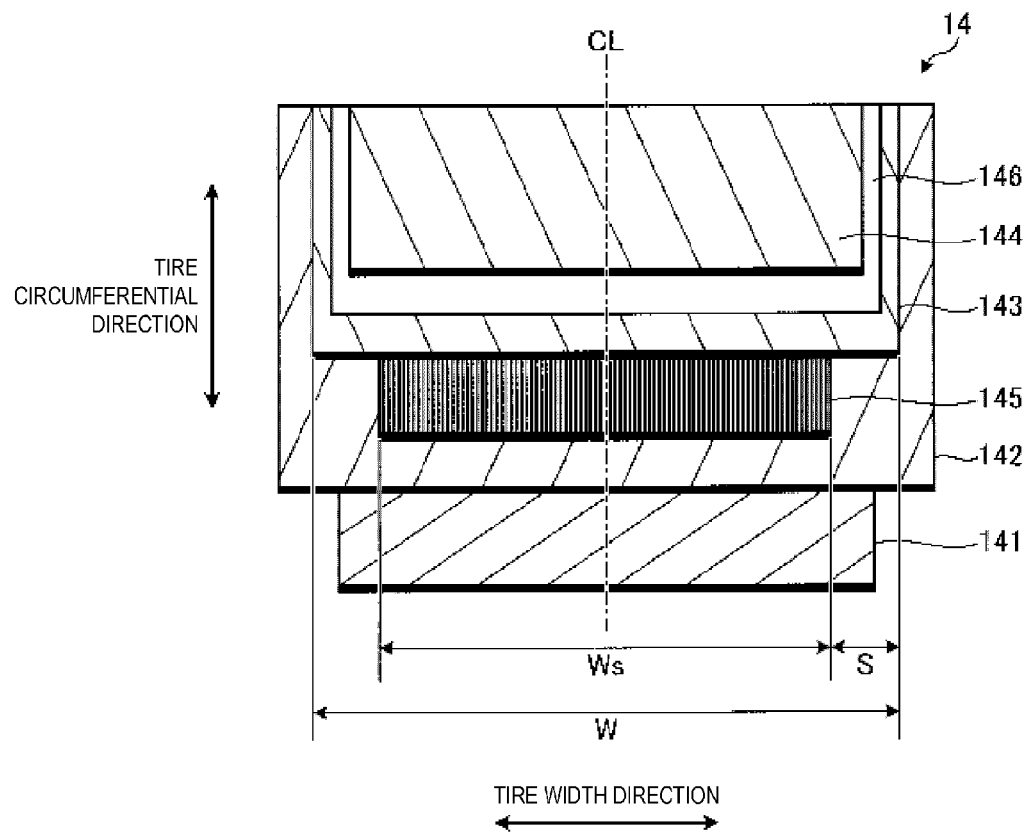
FIG. 3 is an explanatory view illustrating the belt layer of the pneumatic tire depicted in FIG. 1.

FIGS. 2 and 3 are explanatory views illustrating the carcass layer 13 and the belt layer 14 of the pneumatic tire 1 depicted in FIG. 1. In these drawings, FIG. 2 illustrates a region on one side of the tread portion demarcated by the tire equatorial plane CL, and FIG. 3 illustrates a laminated structure of the belt layer 14.

Also, the carcass layer 13 is constituted by a plurality of carcass cords formed from steel or organic fibers (for example, nylon, polyester, rayon, or the like), covered by coating rubber, and subjected to a rolling process, having a carcass angle (the angle of inclination of the fiber direction of the carcass cords with respect to the tire circumferential direction), as an absolute value, of not less than 85 deg and not greater than 95 deg.

The belt layer 14 is formed by laminating a large angle belt 141, a pair of cross belts 142, 143, a belt cover 144, and a circumferential reinforcing layer 145, disposed on the periphery of the carcass layer 13 (see FIG. 2).

The large angle belt 141 is constituted by a plurality of belt cords 1411 formed from steel or organic fibers, covered by coating rubber 1412, and subjected to a rolling process, having a belt angle (the angle of inclination of the fiber direction of the belt cords with respect to the tire circumferential direction), as an absolute value, of not less than 40 deg and not greater than 60 deg. Also, the large angle belt 141 is disposed so as to be laminated outward in the tire radial direction of the carcass layer 13.

The pair of cross belts 142, 143 are constituted by a plurality of belt cords 1421, 1431 formed from steel or organic fibers, covered by coating rubber 1422, and subjected to a rolling process, having a belt angle, as an absolute value, of not less than 10 deg and not greater than 30 deg. Also, the pair of cross belts 142, 143 have belt angles that are of opposite sign to each other, and are laminated so that the fiber directions of the belt cords 1421, 1431 intersect each other (a crossply structure). In the following description, the cross belt 142 positioned on the inner side in the tire radial direction is referred to as "inner-side cross belt", and the cross belt 143 positioned on the outer side in the tire radial direction is referred to as "outer-side cross belt". Three or more cross belts may be disposed so as to be laminated (not illustrated on the drawings). Also, the pair of cross belts 142, 143 are disposed so as to be laminated outward in the tire radial direction of the large angle belt 141.

The belt cover 144 is constituted by a plurality of belt cords 1441 formed from steel or organic fibers, covered by coating rubber 1442, and subjected to a rolling process, having a belt angle, as an absolute value, of not less than 10 deg and not greater than 45 deg. Also, the belt cover 144 is disposed so as to be laminated outward in the tire radial direction of the cross belts 142, 143. In this embodiment, the belt cover 144 has the same belt angle as the outer-side cross belt 143, and, is disposed in the outermost layer of the belt layer 14.

The circumferential reinforcing layer 145 has a configuration in which rubber coated steel belt cords 1451 are wound spirally at a slant within a range of ±5 deg with respect to the tire circumferential direction. Also, the circumferential reinforcing layer 145 is disposed so as to be interposed between the pair of cross belts 142, 143. Also, the circumferential reinforcing layer 145 is disposed inward in the tire width direction of left and right edges of the pair of cross belts 142, 143. Specifically, one or a plurality of wires is wound spirally around the periphery of the inner-side cross belt 142, to form the circumferential reinforcing layer 145. This circumferential reinforcing layer 145 reinforces the stiffness in the tire circumferential direction. As a result, the durability of the tire is improved.

In the pneumatic tire 1, the belt layer 14 may have an edge cover (not illustrated on the drawings). Generally, the edge cover is constituted by a plurality of belt cords formed from steel or organic fibers, covered by coating rubber, and subjected to a rolling process, having a belt angle, as an absolute value, of not less than 0 deg and not greater than 5 deg. Also, the edge cover is disposed outward in the tire radial direction of the left and right edges of the outer-side cross belt 143 (or the inner-side cross belt 142). As a result of the band effect of the edge cover, the difference in radial growth of a tread center region and a shoulder region is reduced, and the uneven wear resistance performance of the tire is improved.

Additionally, with the pneumatic tire 1, the degree of elongation of the belt cords 1441 of the belt cover 144 when subjected to a tension load of 150 N to 200 N is preferably not less than 3.0% and not greater than 5.0%. By making the belt cover 144 from belt cords 1441 with this high elongation property, the tread portion is properly protected.

Also, in the pneumatic tire 1, the belt cords 1451 that constitute the circumferential reinforcing layer 145 is steel wire, and the circumferential reinforcing layer 145 preferably has not less than 17 ends/50 mm and not more than 30 ends/50 mm. Preferably, the external diameter of the belt cords 1451 is in the ranges not less than 1.2 mm and not more than 2.2 mm. When the circumferential reinforcing layer 145 is constituted from a plurality of cords formed from the belt cords 1451 twisted together, the external diameter of the belt cord 1451 is measured as the diameter of a circle that circumscribes the belt cord 1451.

Also, in the pneumatic tire 1, the circumferential reinforcing layer 145 is constituted from a single steel wire that is wound spirally. However, the configuration is not limited thereto, and the circumferential reinforcing layer 145 may be constituted from a plurality of wires wound spirally around side-by-side to each other (multiple winding structure). In this case, preferably, the number of wires is not greater than 5. Also, preferably, the width of winding per unit when 5 wires are wound in multiple layers is not greater than 12 mm. In this way, a plurality (not less than 2 and not greater than 5) of wires can be wound properly at a slant within a range of ±5 deg with respect to the tire circumferential direction.

Also, in the pneumatic tire 1, the degree of elongation of the belt cords 1451 that constitute the circumferential reinforcing layer 145 when subjected to a tension load of 150 N to 200 N is preferably not less than 2.0% and not greater than 3.5%. The belt cords 1451 (high elongation steel wire) have good elongation when a low load is applied compared with normal steel wire, so they can withstand the loads that are applied to the circumferential reinforcing layer 145 during the time from manufacture until the tire is used, so it is possible to suppress damage to the circumferential reinforcing layer 145, which is desirable. Also, the degree of elongation λ1 of the belt cords 1451 of the circumferential reinforcing layer 145 when subjected to a tension load of 150 N to 200 N and the degree of elongation λ2 of the belt cords 1441 of the belt cover 144 (outermost layer of the belt plies) when subjected to a tension load of 150 N to 200 N preferably have a relationship such that λ1≤λ2.

The elongation of the belt cord is measured in accordance with JIS G3510.

Intercord Distance of Belt Plies

Figure 4:
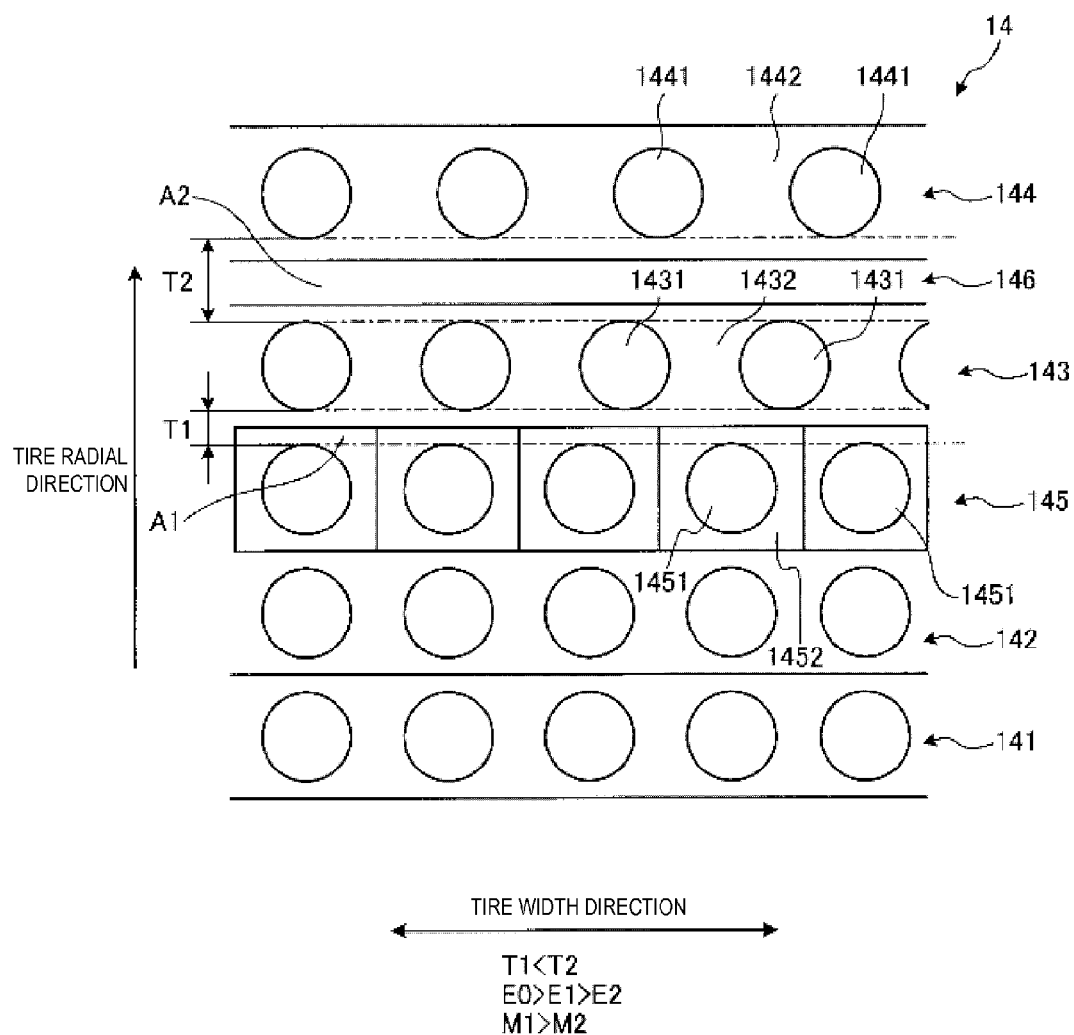
FIG. 4 is an explanatory view illustrating the belt layer of the pneumatic tire depicted in FIG. 1.
Figure 5:
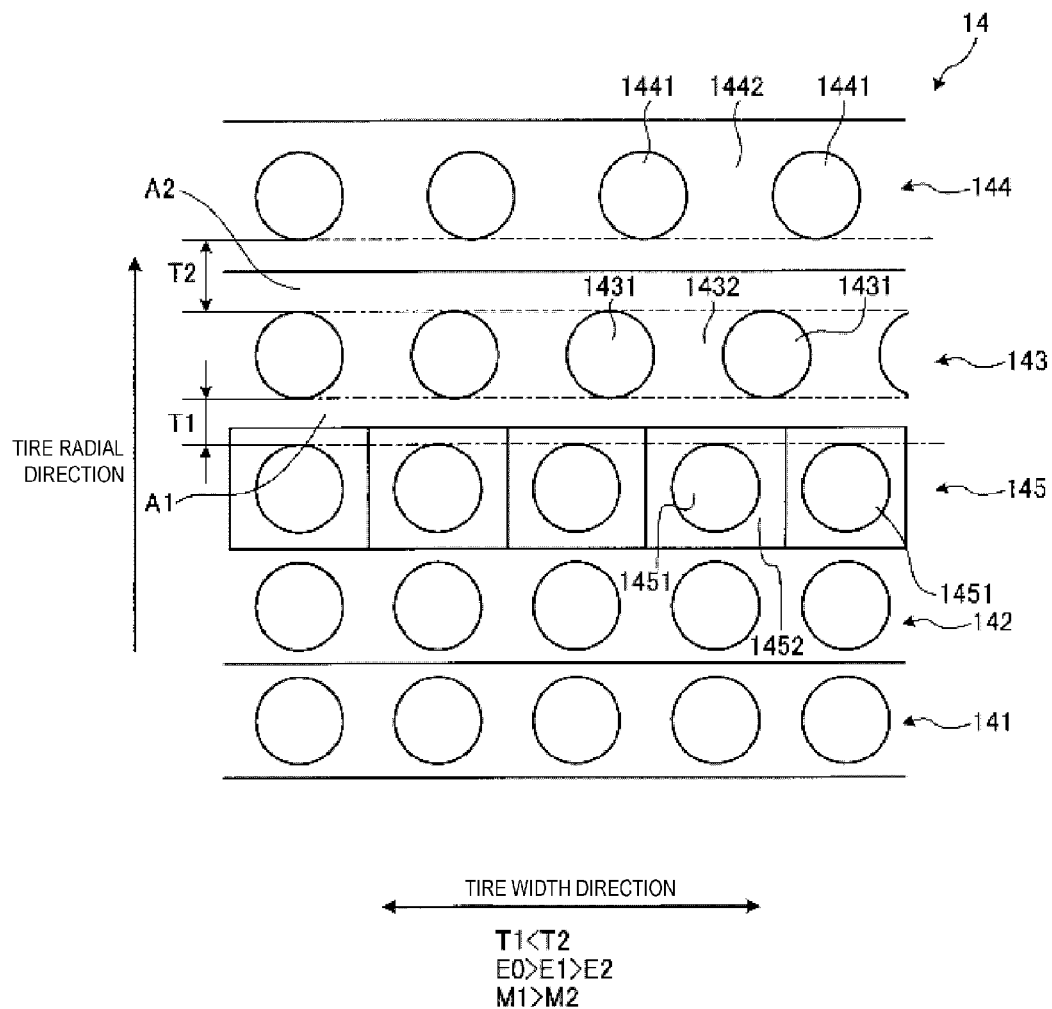
FIG. 5 is an explanatory view illustrating a modified example of the belt layer depicted in FIG. 4.

FIG. 4 is an explanatory view illustrating the belt layer 4 of the pneumatic tire 1 depicted in FIG. 1. FIG. 5 is an explanatory view illustrating a modified example of the belt layer 14 depicted in FIG. 4. These drawings schematically illustrate the arrangement of the belt cords 1411 to 1451 that constitute each of the belt plies 141 to 145.

Normally, in the configuration in which the belt layer has a circumferential reinforcing layer, the stiffness in the tire circumferential direction is high, so the load on the tread portion is large when suddenly braking or suddenly accelerating. Therefore, there is the problem that heel and toe wear and block tears can easily occur compared with a configuration without a circumferential reinforcing layer in the belt layer.

Therefore, in the pneumatic tire 1, the belt layer 14 has the following configuration (see FIG. 4).

First, the intercord distance is the distance in the tire radial direction between belt cords of adjacent belt plies. The intercord distance is defined for each of the adjacent belt plies. Also, the intercord distance is the thickness of the rubber material between belt cords. Also, the plurality of the intercord distances located in the region outward in the tire radial direction of the circumferential reinforcing layer 145 are taken to be T1, T2. . . Tk in order from the intercord distance located inward in the tire radial direction (where k is the number of the belt plies located outward in the tire radial direction of the circumferential reinforcing layer 145).

The intercord distance is measured under the following conditions. The tire is assembled on a standard rim and filled with the regular inner pressure under no load, and the tire unit is applied and fixed with tape or the like to the imaginary line of the tire profile measured by a laser profiler, for example. Next, for between the belt layers to be measured, the distance between the bottom edge position of the wire located outward in the radial direction and the upper edge position of the wire located inward in the tire radial direction is measured using a calipers or the like, and the value is taken to be the intercord distance. The laser profiler used here is a tire profile measuring device (manufactured by Matsuo Co., Ltd.).

Also, "standard rim" refers to a "standard rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the regular internal pressure is an air pressure of 180 kPa, and the regular load is 88% of the maximum load capacity.

In this case, the intercord distances T1 to Tk have a relationship such that T1≤T2≤ . . . ≤Tk and T1<Tk.

For example, in the configuration in FIG. 4, the belt layer 14 is constituted by laminating the large angle belt 141, the inner-side cross belt 142, the circumferential reinforcing layer 145, the outer-side cross belt 143, and the belt cover 144 in the order in the region from the inward in the tire radial direction. Therefore, the belt cover 144 is disposed on the outermost side in the tire radial direction. Also, the belt cords 1411 to 1451 of the belt plies 141 to 145 are disposed so as to be separated from each other in the tire radial direction. In this way, the intercord distance between adjacent belt plies is produced.

Also, in the region outward in the tire radial direction from the circumferential reinforcing layer 145, the intercord distance T1 between the circumferential reinforcing layer 145 and the outer-side cross belt 143 and the intercord distance T2 between the outer-side cross belt 143 and the belt cover 144 have a relationship such that T1<T2. Specifically, sheet-like shock absorbing rubber 146 is disposed between the outer-side cross belt 143 and the belt cover 144, and the intercord distance T2 is adjusted. In this way, the intercord distance T2 located outward in the tire radial direction is set to be greater than the inward intercord distance T1. The shock absorbing rubber 146 is made from, for example, the same rubber material as the coating rubber of the belt cords 1451 of the circumferential reinforcing layer 145.

In this configuration, in the region outward in the tire radial direction from the circumferential reinforcing layer 145, the intercord distances T1 to Tk are set so as to have a relationship such that T1≤T2≤ . . . ≤Tk and T1<Tk, so variation in the stiffness of the tread portion is alleviated in the direction toward outward in the tire radial direction from the circumferential reinforcing layer 145. In this way, the load acting on the tread portion is relieved, and the uneven wear resistance of the tire is increased.

In the configuration in FIG. 4, preferably the intercord distance T2 located on the outermost side in the tire radial direction and the inward intercord distance T1 have a relationship such that 2.0≤T2/T1≤4.0. Also, in this case, preferably the intercord distances T1, T2 are within the ranges such that 0.2 mm≤T1≤0.5 mm and 0.3 mm≤T2≤1.5 mm. In this way, the intercord distances T1, T2 are made appropriate.

Also, in the configuration in FIG. 4, the sheet-like shock absorbing rubber 146 is disposed between the outer-side cross belt 143 and the belt cover 144, and the intercord distance T2 is adjusted, as described above. However, the configuration is not limited thereto, and the thickness of the coating rubber of the belt cords of each belt ply may be increased or decreased to adjust the intercord distances T1, T2 (see FIG. 5). For example, in the configuration in FIG. 5, the shock absorbing rubber 146 in FIG. 4 is omitted, and instead the coating rubber 1432 of the belt cords 1431 of the outer-side cross belt 143 and the coating rubber 1442 of the belt cords 1441 of the belt cover 144 each have a thick structure. In this way, the intercord distances T1, T2 are set so as to have a relationship such that T1<T2.

Number of Belt Ply Ends

Additionally, the numbers of ends of belt cords of the plurality of the belt plies in the region outward in the tire radial direction from the circumferential reinforcing layer 145 are taken to be E0, E1. . . Ek in the order from the number of ends of the belt cords of the circumferential reinforcing layer 145 (where k is the number of the belt plies located outward in the tire radial direction of the circumferential reinforcing layer 145).

In this case, the numbers of ends E0 to Ek have a relationship such that E0≥E1≥ . . . ≥Ek and E0>Ek (see FIG. 4).

For example, in the configuration in FIG. 4, the outer-side cross belt 143 and the belt cover 144 are each disposed outward in the tire radial direction of the circumferential reinforcing layer 145. Also, the number of ends E0 of the belt cords 1451 of the circumferential reinforcing layer 145, the number of ends E1 of the belt cords 1431 of the outer-side cross belt 143, and the number of ends E2 of the belt cords 1441 of the belt cover 144 have a relationship such that E0>E1>E2. Therefore, each of the belt plies 143 to 145 is constituted so that the number of ends E0 to E2 of the belt cords becomes smaller in the direction toward outward in the tire radial direction from the circumferential reinforcing layer 145. Also, the number of ends E2 of the belt cords 1441 of the belt cover 144 located on the outermost side in the tire radial direction and the number of ends E0 of the belt cords 1451 of the circumferential reinforcing layer 145 are set so as to have a relationship such that 1.0<E0/E2<2.0.

In this configuration, the stiffness of the belt layer 14 gradually decreases in the direction toward outward in the tire radial direction from the circumferential reinforcing layer 145. In this way, the load acting on the tread portion can be reduced. Also, by setting the numbers of ends E0 to E2 of the belt cords so that they become smaller in the direction toward outward in the tire radial direction from the circumferential reinforcing layer 145, it is possible to further reduce the load acting on the tread portion.

In the configuration in FIG. 4, preferably the intercord distance T2 and the inward intercord distance T1 have a relationship such that 2.0≤T2/T1≤4.0. Also, in this case, preferably the intercord distances T1, T2 are within the ranges such that 0.2 mm≤T1≤0.5 mm and 0.3 mm≤T2≤1.5 mm. In this way, the intercord distances T1, T2 are made appropriate.

Also, in the configuration in FIG. 4, the numbers of ends E0 to E2 have a relationship such that E0>E1>E2. However, the configuration is not limited thereto, and the numbers of ends E0 to E2 may have a relationship such that E0≥E1≥E2 and E0>E2. Therefore, for example, the numbers of ends E0 to E2 may have a relationship such that E0>E1=E2 or E0=E1>E2.

Modulus of Intercord Region

Also, the region between each belt cord of adjacent belt plies is referred to as the intercord region. In FIG. 4, the boundaries between each of the intercord regions A1, A2 are indicated with imaginary lines. Additionally, the moduli at 100% elongation of the rubber material of the plurality of the intercord regions located outward in the tire radial direction of the circumferential reinforcing layer 145 are taken to be M1, M2. . . Mk, in the order from the modulus of the intercord region located inward in the tire radial direction (where k is the number of the belt plies located outward in the tire radial direction of the circumferential reinforcing layer 145).

In this case, the moduli M1 to Mk have a relationship such that M1≥M2≥ . . . ≥Mk and M1>Mk.

For example, in the configuration of FIG. 4, the modulus M1 of the intercord region A1 between the belt cords 1451 of the circumferential reinforcing layer 145 and the belt cords 1431 of the outer-side cross belt 143 (the region corresponding to the intercord distance T1) has a relationship such that M1>M2 with respect to the modulus M2 of the intercord region A2 between the belt cords 1431 of the outer-side cross belt 143 and the belt cords 1441 of the belt cover 144 (the region corresponding to the intercord distance T2. The intercord region located on the outermost side in the tire radial direction). Also, these moduli M1, M2 have a relationship such that 0.2≤M2/M1<1.0. In this case, preferably the moduli M1, M2 are within the ranges such that 50 N/cm$^2$≤M1≤70 N/cm$^2$ and 90 N/cm$^2$≤M2≤110 N/cm$^2$.

In this configuration, the stiffness of the belt layer 14 gradually decreases in the direction toward outward in the tire radial direction from the circumferential reinforcing layer 145. In this way, the load acting on the tread portion can be reduced.

The modulus is measured by a tensile test at room temperature in accordance with JIS K6251 (using No. 3 dumbbells). Also, if there is a plurality of rubber materials in a single intercord region, the modulus is calculated as the average value in the intercord region.

Also, the moduli M1, M2 of each intercord region may be adjusted by changing the modulus of the coating rubber of the belt cords, and if there is a shock absorbing rubber 146 between the belt plies 143, 144, the modulus may be adjusted by changing the rubber material of the shock absorbing rubber 146. For example, in the configuration in FIG. 4, the modulus M1 of the intercord region A1 is adjusted by the modulus of the coating rubber 1452 of the belt cords 1451 of the circumferential reinforcing layer 145, and the modulus of the coating rubber 1432 of the belt cords 1431 of the outer-side cross belt 143. Also, the modulus M2 of the intercord region A2 is adjusted by the modulus of the coating rubber 1432 of the belt cords 1431 of the outer-side cross belt 143, the modulus of the coating rubber 1442 of the belt cords 1441 of the belt cover 144, and the modulus of the shock absorbing rubber 146.

Modified Examples

FIGS. 6 to 9 are explanatory views illustrating modified examples of the belt layer depicted in FIG. 4. These drawings schematically illustrate the arrangement of the belt cords that constitute each of the belt plies 141 to 145. In these modified examples, the same constituents as the configuration illustrated in FIG. 4 are given the same reference numerals, and their explanations are omitted.

In the configuration in FIG. 4, the circumferential reinforcing layer 145 is disposed so as to be interposed between the pair of cross belts 142, 143. Therefore, in the region located outward in the tire radial direction from the circumferential reinforcing layer 145, two belt plies (the outer-side cross belt 143 and the belt cover 144) are disposed, and two intercord distances T1, T2 and two intercord regions A1, A2 are formed.

Figure 6:
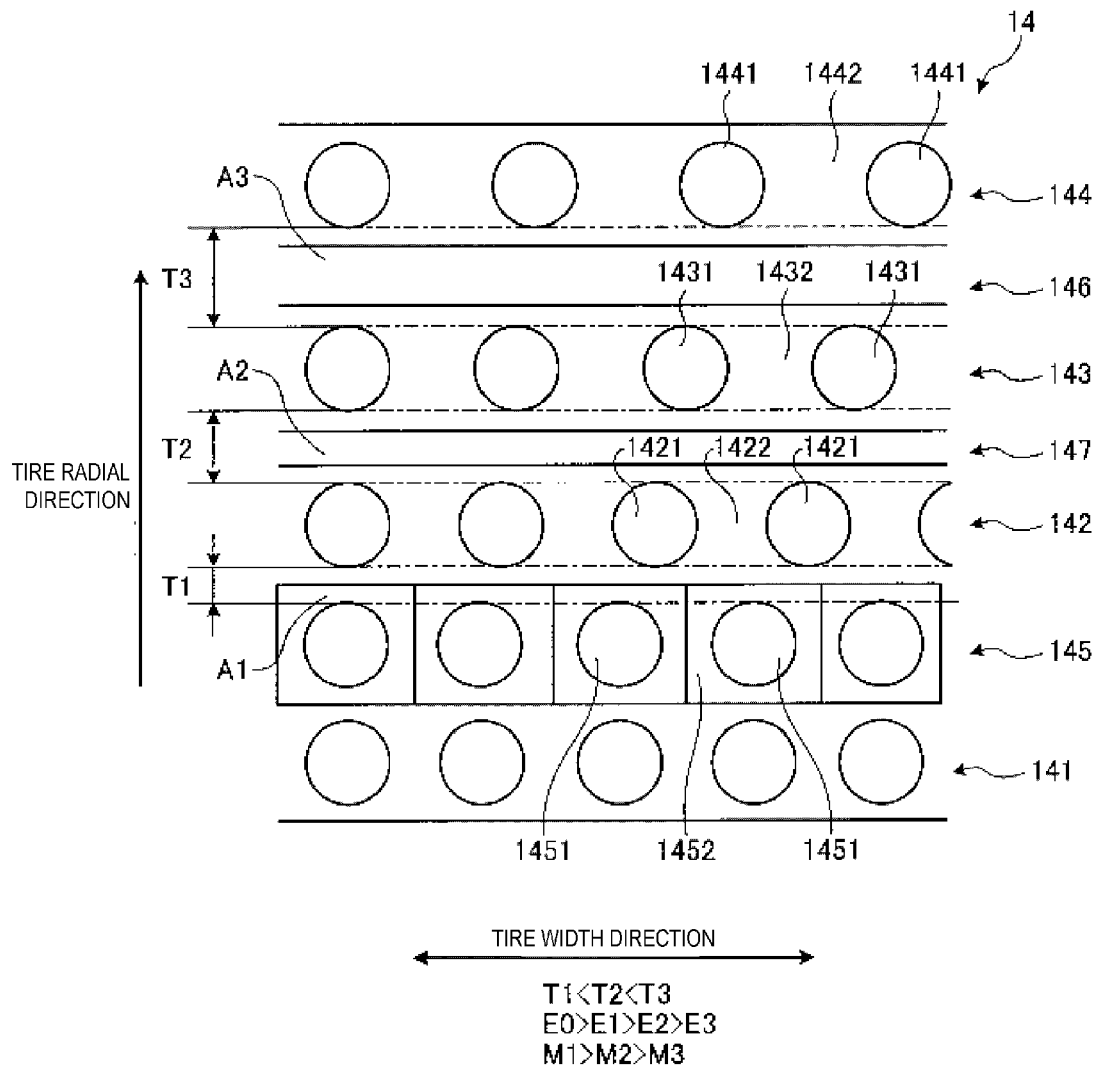
FIG. 6 is an explanatory view illustrating a modified example of the belt layer depicted in FIG. 4.
Figure 7:
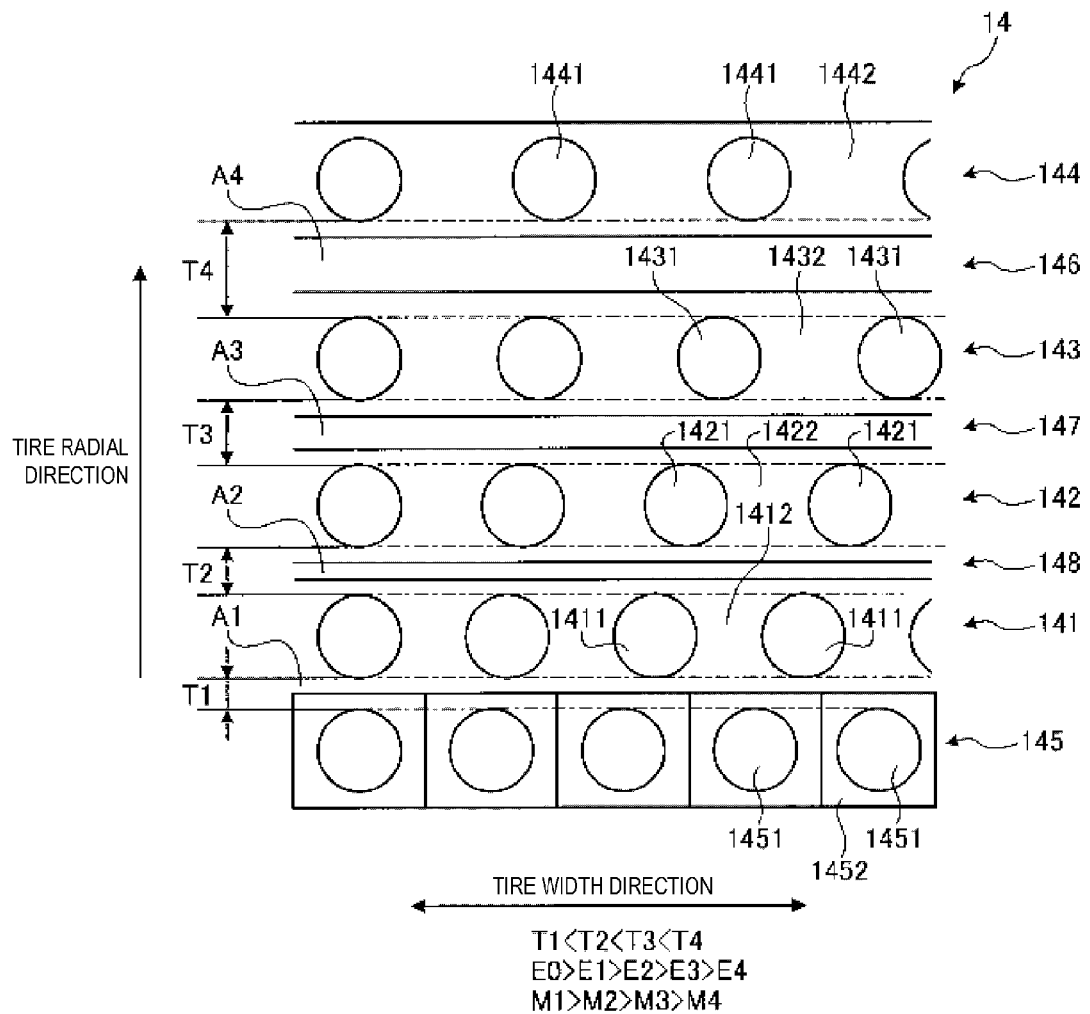
FIG. 7 is an explanatory view illustrating a modified example of the belt layer depicted in FIG. 4.

However, the configuration is not limited thereto, and the circumferential reinforcing layer 145 may be disposed inward in the tire radial direction from the pair of cross belts 142, 143 (see FIG. 6 and FIG. 7).

For example, in the modified example in FIG. 6, the circumferential reinforcing layer 145 is disposed between the large angle belt 141 and the inner-side cross belt 142. Therefore, in the region located outward in the tire radial direction from the circumferential reinforcing layer 145, three belt plies (the pair of cross belts 142, 143, and the belt cover 144) are disposed, and three intercord distances T1 to T3 and three intercord regions A1 to A3 are formed. Also, the three intercord distances T1 to T3 are arranged in the order T1, T2, and T3 from inward in the tire radial direction, and, the three intercord regions A1 to A3 are arranged in the order A1, A2, and A3 from inward in the tire radial direction.

Also, in the region located outward in the tire radial direction from the circumferential reinforcing layer 145, there are three intercord distances T1 to T3, having a relationship such that T1<T2<T3. Specifically, sheet-like shock absorbing rubber 146, 147 is disposed between the inner-side cross belt 142 and the outer-side cross belt 143, and the outer-side cross belt 143 and the belt cover 144, respectively, and these intercord distances T2, T3 are adjusted. In this way, the intercord distances T1 to T3 between each of the belt plies 142 to 145 are set to become greater in the direction toward outward in the tire radial direction from the circumferential reinforcing layer 145.

Also, the intercord distance T3 located on the outermost side in the tire radial direction and the (smallest) intercord distance T1 located on the innermost side in the tire radial direction have a relationship such that 2.0≤T3/T1≤4.0. Also, in this case, the intercord distances T1, T3 are within the ranges such that 0.2 mm≤T1≤0.5 mm and 0.3 mm≤T3≤1.5 mm.

In the modified example of FIG. 6, the three intercord distances T1 to T3 have a relationship such that T1<T2<T3, as described above. However, the configuration is not limited thereto, and the intercord distances T1 to T3 may have a relationship such that T1≤T2≤T3 and T1<T3. Therefore, for example, the intercord distances T1 to T3 may have a relationship such that T1=T2<T3 or T1<T2=T3.

Also, in the modified example in FIG. 6, in the region located outward in the tire radial direction from the circumferential reinforcing layer 145, the number of ends E0 of the belt cords 1451 of the circumferential reinforcing layer 145, the number of ends E1 of the belt cords 1421 of the inner-side cross belt 142, the number of ends E2 of the belt cords 1431 of the outer-side cross belt 143, and the number of ends E3 of the belt cords 1441 of the belt cover 144 have a relationship such that E0>E1>E2>E3. Therefore, each of the belt plies 142 to 145 is constituted so that the numbers of ends E0 to E3 of the belt cords become smaller in the direction toward outward in the tire radial direction from the circumferential reinforcing layer 145. Also, the number of ends E3 of the belt cords 1441 of the belt cover 144 located on the outermost side in the tire radial direction and the number of ends E0 of the belt cords 1451 of the circumferential reinforcing layer 145 are set so as to have a relationship such that 1.0<E0/E3<2.0.

In the modified example in FIG. 6, the numbers of ends E0 to E3 have a relationship such that E0>E1>E2>E3, as described above. However, the configuration is not limited thereto, and the numbers of ends E0 to E3 may have a relationship such that E0≥E1≥E2≥E3 and E1>E3. Therefore, the numbers of ends E0 to E3 may have a relationship such that E0=E1>E2>E3, E0>E1=E2>E3, E0>E1>E2=E3, E0=E1=E2>E3, E0=E1>E2=E3, or E0>E1=E2=E3.

Also, in the modified example in FIG. 6, in the region located outward in the tire radial direction from the circumferential reinforcing layer 145, the modulus M1 in the intercord region A1 (the region corresponding to the intercord distance T1), the modulus M2 in the intercord region A2 (the region corresponding to the intercord distance T2), and the modulus M3 in the intercord region A3 (the region corresponding to the intercord distance T3, the intercord region located on the outermost side in the tire radial direction) have a relationship such that M1>M2>M3.

Also, the modulus M3 in the intercord region A3 located on the outermost side in the tire radial direction and the modulus M1 in the intercord region A1 located on the innermost side in the tire radial direction have a relationship such that $0.2 \leq M3/M1 < 1.0$. Also, the moduli M1, M3 are set to be within the ranges such that $50 \text{ N/cm}^2 \leq M1 \leq 70 \text{ N/cm}^2$ and $90 \text{ N/cm}^2 \leq M2 \leq 110 \text{ N/cm}^2$.

In the modified example in FIG. 6, the moduli M1 to M3 have a relationship such that M1>M2>M3, as described above. However, the configuration is not limited thereto, and the moduli M1 to M3 may have a relationship such that M1≥M2≥M3 and M1>M3. Therefore, the moduli M1 to M3 may have a relationship such that M1=M2>M3 or M2>M1=M3.

Next, in the modified example in FIG. 7, the circumferential reinforcing layer 145 is disposed inward in the tire radial direction of the large angle belt 141 (between the carcass layer 13 and the large angle belt 141). Therefore, in the region outward in the tire radial direction from the circumferential reinforcing layer 145, four belt plies (the large angle belt 141, the pair of cross belts 142, 143, and the belt cover 144) are disposed, and four intercord distances T1 to T4 and four intercord regions A1 to A4 are formed. Also, the four intercord distances T1 to T4 are arranged in the order T1, T2, T3, and T4 from inward in the tire radial direction, and, the four intercord regions A1 to A4 are arranged in the order A1, A2, A3, and A4 from inward in the tire radial direction.

Also, in the region outward in the tire radial direction from the circumferential reinforcing layer 145, the four intercord distances T1 to T4 have a relationship such that T1<T2<T3<T4. Specifically, sheet-like shock absorbing rubber 146 to 148 are disposed between the large angle belt 141 and the inner-side cross belt 142, between the inner-side cross belt 142 and the outer-side cross belt 143, and between the outer-side cross belt 143 and the belt cover 144, respectively, and these intercord distances T2 to T4 are adjusted. In this way, the intercord distances T1 to T4 between each of the belt plies 141 to 145 are set to become greater in the direction toward outward in the tire radial direction from the circumferential reinforcing layer 145.

Also, the intercord distance T4 on the outermost side in the tire radial direction and the (smallest) intercord distance T1 on the innermost side in the tire radial direction have a relationship such that 2.0≤T4/T1≤4.0. Also, in this case, the intercord distances T1, T4 are within the ranges such that 0.2 mm≤T1≤0.5 mm and 0.3 mm≤T4≤1.5 mm.

In the modified example in FIG. 7, the four intercord distances T1 to T4 have a relationship such that T1<T2<T3<T4. However, the configuration is not limited thereto, and the intercord distances T1 to T4 may have a relationship such that T1≤T2≤T3 and T1<T3. Therefore, the size relationship between the intercord distances T1 to T4 can be set arbitrarily in accordance with this condition.

Also, in the modified example in FIG. 7, in the region located outward in the tire radial direction from the circumferential reinforcing layer 145, the number of ends E0 of the belt cords 1451 of the circumferential reinforcing layer 145, the number of ends E1 of the belt cords 1411 of the large angle belt 141, the number of ends E2 of the belt cords 1421 of the inner-side cross belt 142, the number of ends E3 of the belt cords 1431 of the outer-side cross belt 143, and the number of ends E4 of the belt cords 1441 of the belt cover 144 have a relationship such that E0>E1>E2>E3>E4. Therefore, each of the belt plies 141 to 145 is constituted so that the numbers of ends E0 to E4 of the belt cord become smaller in the direction toward outward in the tire radial direction from the circumferential reinforcing layer 145. Also, the number of ends E4 of the belt cords 1441 of the belt cover 144 on the outermost side in the tire radial direction and the number of ends E0 of the belt cords 1451 of the circumferential reinforcing layer 145 are set so as to have a relationship such that 1.0<E0/E4<2.0.

In the modified example in FIG. 7, the numbers of ends E0 to E4 have a relationship such that E0>E1>E2>E3>E4, as described above. However, the configuration is not limited thereto, and the numbers of ends E0 to E4 may have a relationship such that E0≥E1≥E2≥E3≥E4 and E1>E4. Therefore, the size relationship between the numbers of ends E0 to E4 can be set arbitrarily in accordance with this condition.

Also, in the modified example in FIG. 7, in the region outward in the tire radial direction from the circumferential reinforcing layer 145, the modulus M1 in the intercord region A1, the modulus M2 in the intercord region A2, the modulus M3 in the intercord region A3, and the modulus M4 in the intercord region A4 (the intercord region on the outermost side in the tire radial direction) have a relationship such that M1>M2>M3>M4.

Also, the modulus M4 in the intercord region A4 on the outermost side in the tire radial direction and the modulus M1 in the intercord region A1 on the innermost side in the tire radial direction have a relationship such that 0.2<M4/M1<1.0. Also, the moduli M1, M4 are set to be within the ranges 50 N/cm²≤M1≤70 N/cm² and 90 N/cm²≤M2≤110 N/cm².

In the modified example in FIG. 7, the moduli M1 to M4 have a relationship such that M1>M2>M3>M4, as described above. However, the configuration is not limited thereto, and the moduli M1 to M4 may have a relationship such that M1≥M2≥M3≥M4 and M1>M4. Therefore, the size relationship between the moduli M1 to M4 can be set arbitrarily in accordance with this condition.

Also, in the configuration in FIG. 4, the intercord distances T1, T2, the numbers of ends E0 to E2, and the moduli M1, M2 each have their own predetermined size relationship (such that T1<T2, E0>E1>E2, and M1>M2).

Figure 8:
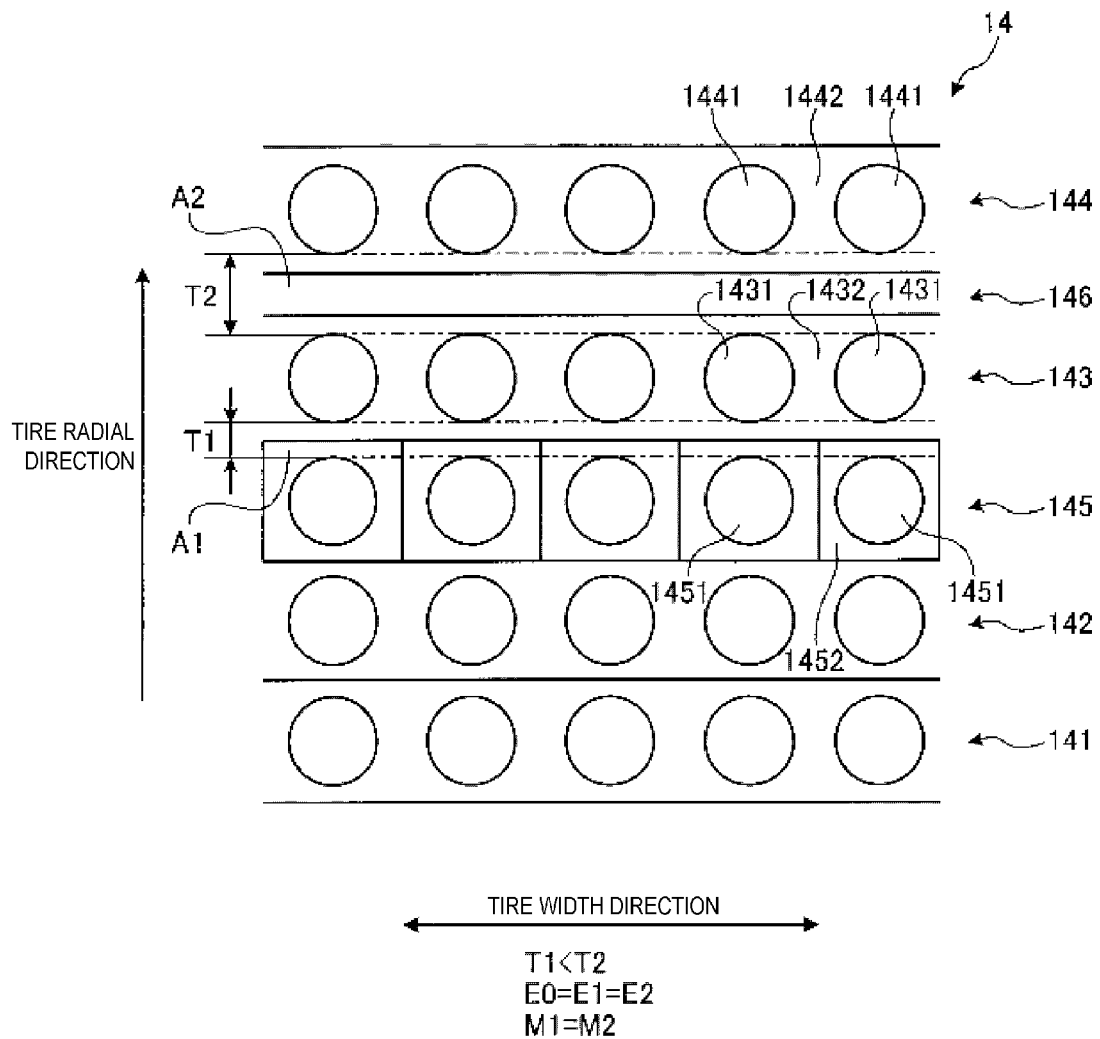
FIG. 8 is an explanatory view illustrating a modified example of the belt layer depicted in FIG. 4.
Figure 9:
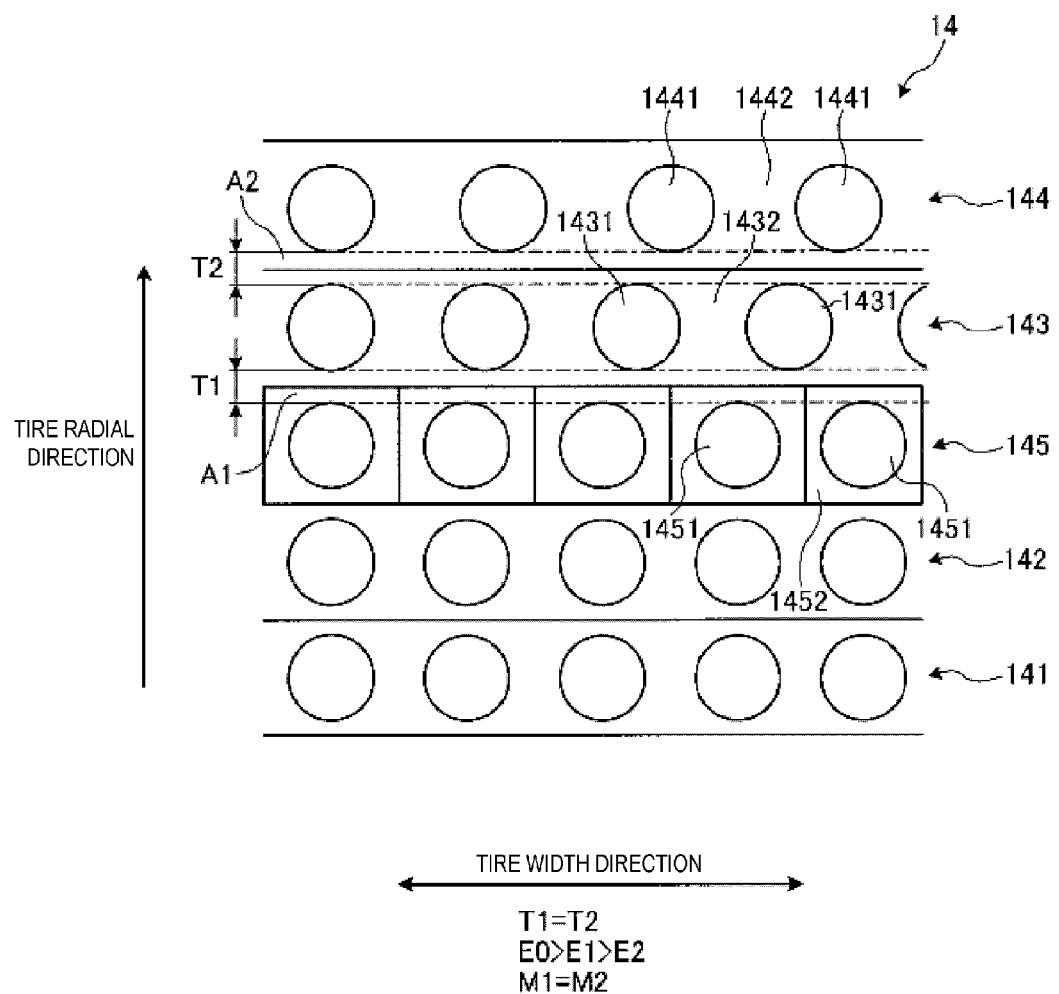
FIG. 9 is an explanatory view illustrating a modified example of the belt layer depicted in FIG. 4.

However, the configuration is not limited thereto, and there may be a size relationship between one or two of the intercord distances T1, T2, the numbers of ends E0 to E2, and the moduli M1, M2 (see FIGS. 8 and 9).

For example, in the modified example in FIG. 8, the intercord distances T1, T2 only have a relationship such that T1<T2, and the numbers of ends E0 to E2 and the moduli M1, M2 are each set to be equal. Also, in the modified example in FIG. 9, the numbers of ends E0 to E2 only have a relationship such that E0>E1>E2, and the intercord distances T1, T2 and the moduli M1, M2 are each set to be equal. Also in these configurations, the load acting on the tread portion is relieved, and the uneven wear resistance of the tire is increased.

Additional Data

Additionally, in the configuration in FIG. 3, the circumferential reinforcing layer 145 is disposed inward in the tire width direction of the left and right edges of the narrower cross belt 143 of the pair of cross belts 142, 143. Also, preferably the width W of the narrower cross belt 143 and the distance S from the edge of the circumferential reinforcing layer 145 to the edge of the narrower cross belt 143 are in the ranges such that 0.03≤S/W. This point is the same even if the circumferential reinforcing layer 145 has a divided configuration (not illustrated on the drawings).

For example, in the configuration in FIG. 3, the outer-side cross belt 143 has a narrow width structure, and the circumferential reinforcing layer 145 is disposed inward in the tire width direction of the left and right edges of the outer-side cross belt 143. Also, the outer-side cross belt 143 and the circumferential reinforcing layer 145 are disposed so as to be left-right symmetric centered on the tire equatorial plane CL. Also, in a region demarcated by the tire equatorial plane CL, the positional relationship S/W of the edge of the outer-side cross belt 143 and the edge of the circumferential reinforcing layer 145 is made appropriate to be within the ranges as described above.

In this configuration, the positional relationship S/W of the edges of the cross belts 142, 143 and the edges of the circumferential reinforcing layer 145 is made appropriate, and it is possible to reduce the strain that is produced in the rubber material around the circumferential reinforcing layer 145.

The width W and the distance S are measured as distances in the tire width direction in a cross sectional view in a tire meridian direction. Also, there is no upper limit to the value of S/W in particular, but it is restricted by the relationship of the width Ws of the circumferential reinforcing layer 145 and the width W of the narrower cross belt 143.

Also, the width Ws of the circumferential reinforcing layer 145 is set to be 0.60≤Ws/W. When the circumferential reinforcing layer 145 has a divided structure (not illustrated in the drawings), the width Ws of the circumferential reinforcing layer 145 is the sum of the widths of each divided portion.

Effect

As described above, the pneumatic tire 1 includes the belt layer 14 that is formed by laminating the plurality of belt plies 141 to 145 including the circumferential reinforcing layer 145 (see FIGS. 2 and 3). Also, the belt layer 14 includes at least two belt plies outward in the tire radial direction of the circumferential reinforcing layer 145 (see FIGS. 4 to 8). Also, the intercord distances T1 to Tk have a relationship such that T1≤T2≤ . . . ≤Tk and T1<Tk.

In this configuration, in the region outward in the tire radial direction from the circumferential reinforcing layer 145, the intercord distances T1 to Tk are set so as to have a relationship such that T1≤T2≤ . . . ≤Tk, and T1<Tk, so variation in the stiffness of the tread portion is alleviated in the direction toward outward in the radial direction from the circumferential reinforcing layer 145. This has the advantage that the load acting on the tread portion is relieved, and the uneven wear resistance of the tire is increased.

Also, in the pneumatic tire 1, the intercord distance T1 and the intercord distance Tk have a relationship such that 2.0≤Tk/T1≤4.0. In this configuration, in the region outward in the tire radial direction from the circumferential reinforcing layer 145, the ratio Tk/T1 of the intercord distance Tk on the outermost side in the tire radial direction to the intercord distance T1 on the innermost side in the tire radial direction is made appropriate. This has the advantage that the load acting on the tread portion is effectively relieved, and the uneven wear resistance of the tire is increased.

Also, in the pneumatic tire 1, the numbers of ends E0 to Ek of the belt plies have a relationship such that E0≥E1≥ . . . ≥Ek and E0>Ek (see FIGS. 4 to 7 and FIG. 9). In this configuration, variation in the stiffness of the tread portion is alleviated in the direction toward outward in the tire radial direction from the circumferential reinforcing layer 145. This has the advantage that the load acting on the tread portion is relieved, and the uneven wear resistance of the tire is increased.

Also, in the pneumatic tire 1, the number of ends E0 and the number of ends Ek have a relationship such that 1.0<E0/Ek<2.0. This configuration has the advantage that, because the number of ends E0 and the number of ends Ek have a relationship such that E0/Ek<2.0, the increase in tire weight is suppressed, and separation of the belt plies due to insufficient quantity of rubber is suppressed. Also, because the number of ends E0 and the number of ends Ek have a relationship such that 1.0<E0/Ek, the stiffness of the belt layer 14 reduces in the proper manner in the direction toward outward in the tire radial direction from the circumferential reinforcing layer 145, and this has the advantage that the load acting on the tread portion is reduced.

Also, in the pneumatic tire 1, the moduli M1 to Mk have a relationship such that M1≥M2≥ . . . ≥Mk and M1>Mk (see FIGS. 4 to 7). In this configuration, variation in the stiffness of the tread portion is alleviated in the direction toward outward in the tire radial direction from the circumferential reinforcing layer 145. This has the advantage that the load acting on the tread portion is relieved, and the uneven wear resistance of the tire is increased.

With the pneumatic tire 1, the modulus M1 and the modulus Mk have a relationship such that 0.2≤Mk/M1<1.0. In this configuration, in the region outward in the tire radial direction from the circumferential reinforcing layer 145, the ratio Mk/M1 of the modulus Mk in the intercord region Ak on the outermost side in the tire radial direction to the modulus M1 in the intercord region A1 on the innermost side in the tire radial direction is made appropriate. This has the advantage that the load acting on the tread portion is effectively reduced.

Also, in the pneumatic tire 1, the plurality of belt plies includes the large angle belt 141, the pair of cross belts 142, 143 disposed outward in the tire radial direction of the large angle belt 141, the belt cover 144 disposed outward in the tire radial direction of the pair of cross belts 142, 143, and the circumferential reinforcing layer 145 disposed between the pair of cross belts 142, 143, inward in the tire radial direction from the pair of cross belts 142, 143, or inward in the tire radial direction from the large angle belt 141 (see FIG. 2 and FIG. 3).

Also, in the pneumatic tire 1, the belt cover 144 has a belt angle, as an absolute value, of not less than 10 deg and not greater than 45 deg. This has the advantage that the tread portion is properly protected.

Also, in the pneumatic tire 1, the degree of elongation of the belt cords 1441 of the belt cover 144 when subjected to a tension load of 150 N to 200 N is not less than 3.0% and not greater than 5.0%. This has the advantage that the tread portion is properly protected.

Also, in the pneumatic tire 1, the degree of elongation of the belt cords 1451 of the circumferential reinforcing layer 145 when subjected to a tension load of 150 N to 200 N is not less than 2.0% and not greater than 3.5%.

Also, in the pneumatic tire 1, the degree of elongation $\lambda 1$ of the belt cords 1451 of the circumferential reinforcing layer 145 when subjected to a tension load of 150 N to 200 N and the degree of elongation $\lambda 2$ of the belt cords 1441 of the belt cover 144 (belt ply in the outermost layer) when subjected to a tension load of 150 N to 200 N have a relationship such that $\lambda 1 \leq \lambda 2$.

Also, in the pneumatic tire 1, the circumferential reinforcing layer 145 is disposed inward in the tire width direction from the left and right edges of the narrower cross belt 143 of the pair of cross belts 142, 143 (see FIG. 3). Also, the width W of the narrower cross belt 143 and the distance S from the edge of the circumferential reinforcing layer 145 to the edge of the narrower cross belt 143 are in the ranges such that 0.03≤S/W. In this configuration, the positional relationship S/W of the edges of the cross belts 142, 143 and the edge of the circumferential reinforcing layer 145 is made appropriate, and this has the advantage that it is possible to reduce strain that is produced in the rubber material around the circumferential reinforcing layer 145.

Application Example

Also, in the pneumatic tire 1, in the state where the tire is assembled on a standard rim, the regular inner pressure is applied to the tire, and the regular load is applied, preferably the aspect ratio HW is within the ranges such that 40%≤HW≤70%. In addition, the pneumatic tire 1, as in this embodiment, is preferably used as a pneumatic tire for heavy loads, such as buses or trucks and the like. With tires having this aspect ratio HW, in particular, pneumatic tires for heavy loads such as buses, trucks and the like, the ground contact shape can easily become hourglass-shape, and the occurrence of uneven wear is significant. Therefore, by applying the configuration of the pneumatic tire 1 to a tire having this aspect ratio HW, it is possible to obtain a more significant uneven wear suppression effect.

Also, in particular, preferably the pneumatic tire 1 has a block pattern (not illustrated on the drawings). As described above, in the configuration in which the belt layer has the circumferential reinforcing layer, the stiffness in the tire circumferential direction is high. Therefore, in a configuration having a block pattern, the occurrence of heel and toe wear is particularly a problem. Therefore, in this configuration, the uneven wear resistance of the tire is increased by applying the configuration of the pneumatic tire 1.

EXAMPLES

FIGS. 10a through 11b are tables showing the results of performance testing of pneumatic tires according to the embodiment of the present invention.

In these performance tests, evaluation was carried out on several different tires for (1) heel and toe wear resistance performance, (2) block tear resistance performance, and (3) durability (see FIGS. 10a through 11b). Pneumatic tires having a tire size of 445/50R22.5 were assembled on a "design rim" as prescribed by TRA, and 80% of the air pressure in "Tire Load Limits at Various Cold Inflation Pressures" as prescribed by TRA, and the maximum value of "Tire Load Limits at Various Cold Inflation Pressures" were applied.

(1) In the evaluation of heel and toe wear resistance performance and (2) block tear resistance performance, the pneumatic tire was mounted on a 6×4 tractor-trailer test vehicle. Then, after the test vehicle had traveled 50,000 km on a normal paved road, the tires were examined for the amount of heel and toe wear and block tearing. Evaluations were performed by indexing the measurement results with the conventional example as the standard score (100). In these evaluations, higher scores were preferable.

(3) Durability evaluation was carried out with low pressure durability tests using an indoor drum testing machine. Then, while traveling at 45 km/h, the load was increased by 5% every 24 hours from the load prescribed by TRA, and when the tire broke down, the distance traveled was measured. Evaluations were performed by indexing the measurement results with the conventional example as the standard score (100). In these evaluations, higher scores were preferable.

The pneumatic tire 1 according to Working Examples 1 to 21 had the configuration of FIG. 4 or FIG. 8, and the intercord distances T1, T2, the numbers of ends E0 to E2 of the belt plies, and the moduli M1 and M2 were made appropriate. Also, the positional relationship S/W of the edge of the outerside cross belt 143 and the edge of the circumferential reinforcing layer 145 was set to be S/W=0.3. Also, the tread portion had a block pattern (not illustrated on the drawings).

The pneumatic tire of the Conventional Example had different intercord distances T1, T2, numbers of ends E0 to E2, and moduli M1, M2, and the like, of the belt plies compared with the pneumatic tire 1 according to Working Example 1.

As shown in the test results, it can be seen that compared with the pneumatic tire of Conventional Example, the pneumatic tire according to Working Examples 1 to 24 had greater heel and toe wear resistance performance, block tear resistance performance, and durability.

What is claimed is:

1. A pneumatic tire comprising a belt layer formed by laminating a plurality of belt plies including: a large angle belt; a pair of cross belts disposed outward in the tire radial direction of the large angle belt; a belt cover disposed outward in the tire radial direction of the pair of cross belts; and a circumferential reinforcing layer disposed between the pair of cross belts, inward in the tire radial direction of the pair of cross belts or inward in the tire radial direction of the large angle belt; the belt layer comprising:

wherein intercord distance is a distance in the tire radial direction between belt cords of adjacent belt plies, and a plurality of the intercord distances located in a region outward in the tire radial direction of the circumferential reinforcing layer are taken to be T1, T2... Tk in order from the intercord distance inward in the tire radial direction (where k is a number of the belt plies located outward in the tire radial direction of the circumferential reinforcing layer), the intercord distances T1 to Tk of adjacent belt plies have a relationship such that $T1 \leq T2 \leq \ldots \leq Tk$ and $T1 < Tk$, in a cross sectional view in a tire meridian direction, the circumferential reinforcing layer extends in the tire axial direction and intersects a tire equatorial plane, a width Ws of the circumferential reinforcing layer and a width W of a narrower cross belt of the pair of cross belts have a relationship such that $0.60 \leq Ws/W$, and the intercord distances are present over the entire axial extent of the circumferential reinforcing layer.

2. The pneumatic tire according to claim 1, wherein the intercord distance T1 and the intercord distance Tk have a relationship such that $2.0 \leq Tk/T1 \leq 4.0$.

3. The pneumatic tire according to claim 1, wherein when numbers of ends of belt cords of a plurality of the belt plies located in a region outward in the tire radial direction of the circumferential reinforcing layer are taken to be E0, E1... Ek in order from the number of ends of the belt cords of the circumferential reinforcing layer (where k is the number of the belt plies located outward in the tire radial direction of the circumferential reinforcing layer), the numbers of ends E0 to Ek have a relationship such that $E0 \geq E1 \geq \ldots \geq Ek$ and $E0 > Ek$.

4. The pneumatic tire according to claim 3, wherein the number of ends E0 and the number of ends Ek have a relationship such that $1.0 < E0/Ek < 2.0$.

5. The pneumatic tire according to claim 1, wherein when an intercord region is a region between the belt cords of adjacent belt plies, and a modulus at 100% elongation of a rubber material of a plurality of the intercord regions located in a region outward in the tire radial direction of the circumferential reinforcing layer are taken to be M1, M2... Mk in order from the modulus of the intercord region inward in the tire radial direction (where k is the number of the belt plies located outward in the tire radial direction of the circumferential reinforcing layer), and the moduli M1 to Mk have a relationship such that $M1 \geq M2 \geq \ldots \geq Mk$ and $M1 > Mk$.

6. The pneumatic tire according to claim 5, wherein the modulus M1 and the modulus Mk have a relationship such that $0.2 \leq Mk/M1 < 1.0$.

7. The pneumatic tire according to claim 1, wherein a belt angle, as an absolute value, of the belt cover is not less than 10 deg and not greater than 45 deg.

8. The pneumatic tire according to claim 1, wherein a degree of elongation of the belt cords of the belt cover when subjected to a tension load of 150 N to 200 N is not less than 3.0% and not greater than 5.0%.

9. The pneumatic tire according to claim 1, wherein the degree of elongation of the belt cords of the circumferential reinforcing layer when subjected to a tension load of 150 N to 200 N is not less than 2.0% and not greater than 3.5%.

10. The pneumatic tire according to claim 1, wherein the belt layer comprises a belt cover as an outermost layer, and a degree of elongation $\lambda 1$ of the belt cords of the circumferential reinforcing layer when subjected to a tension load of 150 N to 200 N and a degree of elongation $\lambda 2$ of the belt cords of the belt cover when subjected to a tension load of 150 N to 200 N have a relationship such that $\lambda 1 \leq \lambda 2$.

11. The pneumatic tire according to claim 1, wherein the circumferential reinforcing layer is disposed inward in the tire width direction of left and right edges of a narrower crossing belt of the pair of cross belts, and a width W of the narrower crossing belt and a distance S from an edge of the circumferential reinforcing layer to an edge of the narrower crossing belt are in ranges such that $0.03 \leq S/W$.

12. The pneumatic tire according to claim 1, wherein the intercord distances T1 and T2 have a relationship such that $2.0 \leq T2/T1 \leq 4.0$.

13. The pneumatic tire according to claim 12, wherein the intercord distances T1 and T2 are within the ranges such that $0.2 \text{ mm} \leq T1 \leq 0.5 \text{ mm}$ and $0.3 \text{ mm} \leq T2 \leq 1.5 \text{ mm}$.

14. The pneumatic tire according to claim 1, wherein the circumferential reinforcing layer comprises belt cords of steel wire of not less than 17 ends/50 mm and not more than 30 ends/50 mm.

15. The pneumatic tire according to claim 14, wherein an external diameter of the belt cords is in a range of not less than 1.2 mm and not more than 2.2 mm.

16. A pneumatic tire comprising a belt layer formed by laminating a plurality of belt plies including: a pair of cross belts; a belt cover disposed outward in the tire radial direction of the pair of cross belts; and a circumferential reinforcing layer disposed between the pair of cross belts or inward in the tire radial direction of the pair of cross belts; the belt layer comprising:

wherein intercord distance is a distance in the tire radial direction between belt cords of adjacent belt plies, and a plurality of the intercord distances located in a region outward in the tire radial direction of the circumferential reinforcing layer are taken to be T1, T2 . . . Tk in order from the intercord distance inward in the tire radial direction (where k is a number of the belt plies located outward in the tire radial direction of the circumferential reinforcing layer), the intercord distances T1 to Tk of adjacent belt plies have a relationship such that $T1 \leq T2 \leq \ldots \leq Tk$ and $T1 < Tk$, in a cross sectional view in a tire meridian direction, the circumferential reinforcing layer extends in the tire axial direction and intersects a tire equatorial plane, a width Ws of the circumferential reinforcing layer and a width W of a narrower cross belt of the pair of cross belts have a relationship such that $0.60 \leq Ws/W$, and the intercord distances are present over the entire axial extent of the circumferential reinforcing layer.

* * * * *